United States Patent [19]

Kingston

[11] 3,968,584
[45] July 13, 1976

[54] ILLUMINATED SIGN
[76] Inventor: Willard L. Kingston, 225 W. Forest St., Brigham City, Utah 84302
[22] Filed: July 18, 1974
[21] Appl. No.: 489,770

[52] U.S. Cl............................. 40/130 K; 240/1 EL
[51] Int. Cl.² .................................... G09F 13/18
[58] Field of Search .......... 40/130 K, 133 R, 132 D, 40/204, 205, 130 D, 130 R, 132 R; 240/1 EL, 2.1, 8.16

[56] References Cited
UNITED STATES PATENTS

| 1,792,635 | 2/1931 | Gropper | 40/132 R |
|---|---|---|---|
| 1,826,389 | 10/1931 | Fullerton | 40/136 X |
| 2,104,230 | 1/1938 | Kiss | 40/204 |
| 2,795,069 | 6/1957 | Hardesty | 40/130 K UX |
| 2,880,536 | 4/1959 | Sullivan | 240/1 EL X |
| 2,916,606 | 12/1959 | Laufer et al. | 240/2.1 |
| 2,945,313 | 7/1960 | Hardesty | 40/130 K |
| 3,356,839 | 12/1967 | Mehess et al. | 240/1 EL X |
| 3,729,626 | 4/1973 | Thurlow | 240/8.16 X |
| 3,780,463 | 12/1973 | Aronoff | 40/130 K |

Primary Examiner—Louis G. Mancene
Assistant Examiner—John F. Pitrelli
Attorney, Agent, or Firm—Edward E. McCullough

[57] ABSTRACT

A very thin and rugged illuminated sign has a transparent, light-source plate with cavities in its edges to receive light bulbs. One side of the plate is covered with opaque material and the other with translucent material. Both surfaces are internally reflective, so that light from the bulbs is conserved and distributed substantially uniformly throughout the plate. At least one opaque plate, having a transparent (preferably colored and embossed) character therein, covers the translucent side of the light-source plate; so that light therefrom illuminates the characters. The terminal ends of the light bulbs are oriented outwardly for easy connection in an electric circuit concealed in a frame that surrounds both plates and confines them together. The frame may function as one of the electrical conductors.

6 Claims, 2 Drawing Figures

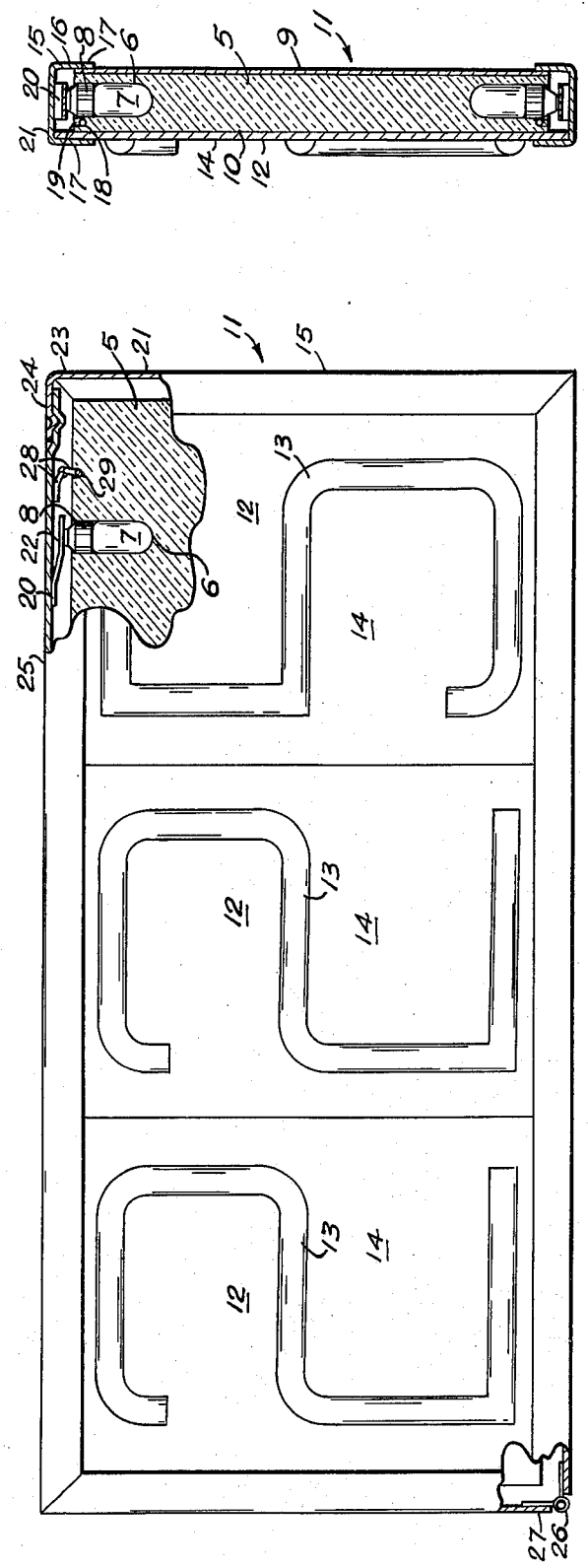

ILLUMINATED SIGN

BACKGROUND OF THE INVENTION

1. Field of the Invention

This invention relates broadly to illuminated signs. More particularly, it relates to illuminated signs that use a minimum of electric power, that can be made very thin, and that are especially useful as house number designations.

2. Description of the Prior Art

Most prior art illuminated signs of the type herein described are of a box-like construction wherein a box containing electric lamps has a cover comprising a panel having transparent or translucent characters or designs thereon. Although such constructions are useful as large signs, they tend to be excessively bulky and unattractive when used as small signs, e.g., house number designations. This box type of construction is typified in French Pat. Nos. 397,163 to M. Lippert and 709,654 to N. V. Phillips, Gloeilampenfabricken.

Other prior art signs have used edge lighting wherein light bulbs extend partially through a transparent panel with characters thereon. These are exemplified in U.S. Pat. No. 844,940 to J. Hotchner and U.S. Pat. No. 2,097,625 to C. L. Langlotz. This type, although useful for certain kinds of signs, also tends to be objectionably bulky for small signs. In addition, the design thereof must accommodate the protruding light bulbs, which are not attractive in some applications.

SUMMARY OF THE INVENTION

The present invention overcomes these difficulties in the prior art devices by providing an illuminated sign that can be made very thin, light-weight, uses a minimal amount of electric power, and can be very attractive in appearance.

The primary member of the invention is a transparent light source plate having cavities in its edges. Electric light bulbs are seated in the cavities with their terminal ends extending outwardly and exposed. One side of this plate is covered with opaque material and the other side is covered with translucent material that transmits diffuse light. Both surfaces are internally reflective; so that the light from the light bulbs seated in the edges of the plate may be diffused throughout the plate and cannot escape except through the translucent side thereof. Hence, light from the bulbs is used with maximum efficiency and conservation to minimize the size of the bulbs and power requirements of the sign. An opaque plate having a colored, transparent, embossed character is superimposed on the translucent side of the light-source plate.

A frame that is channel-shaped in cross section surrounds the two pates, which are confined between the flanges of the channel. The light bulbs are connected together in a circuit by two electrical conductors, one of which may be the frame itself.

The invention has been found to be especially useful as a small sign for designating house numbers. As such, the light-source plate is an elongated rectangle; and it is usually covered by several opaque plates in series, each having a single transparent, colored, embossed number—the opaque plates being easily interchangeable to designate different house numbers.

Primary objects of the invention are to provide an illuminated sign: (1) that may be made very thin and attractive in appearance; (2) that diffuses light from small bulbs throughout the sign; and (3) that maximizes conservation of light and uses a small amount of light so efficiently that very little electric power is consumed. Hence, the sign may be left "on" at all times.

Important features of the invention are that it is very simple and reliable in construction; it is easy to manufacture; and the light bulbs and house numbers may be very conveniently replaced or interchanged.

Other objects and advantages of the invention may be noted as the following detailed description is read with reference to the accompanying drawings. The same parts are designated by the same numerals throughout the disclosure.

BRIEF DESCRIPTION OF THE DRAWINGS

In the drawings:

FIG. 1 is a front elevation of the invention, with some parts broken away to show internal construction; and FIG. 2 is a cross section of the invention taken on Lines 2—2 of FIG. 1.

DESCRIPTION OF THE PREFERRED EMBODIMENTS

As shown in the Figures, a light-source plate 5 has cylindrical recesses 6 in which small, low-power light bulbs 7 are inserted with their terminal ends 8 extending outwardly. The bulbs 7 are typically long-life, 16 volt, ½ candlepower bulbs. The light-source plate 5 is typically made of transparent Plexiglas (synthetic acrylate resin). It has an opaque surface 9 on one side that is internally reflective, i.e., reflects light back into the light source plate 5. This opaque surface 9 may be provided by any of a number of means, such as an opaque coat of paint, opaque tape, or metal foil. In a preferred embodiment, it is white paint. The opposite surface 10 is made translucent in some way such as etching or a thin coat of white paint.

The preferred embodiment of the invention shown in the Figures is a small sign to designate house numbers, primarily for private dwellings. As such, the light source plate 5 has the form of an elongated rectangle. At least one opaque plate 12 having a transparent, preferably colored and embossed, character 13 is superimposed on the translucent surface 10 of the light-source plate 5. This opaque plate is preferably made of a colored, light-transmitting material covered, except for the character, with an opaque material 14 such as a heavy coat of paint. This material 14 could also be metal foil, plastic, or any opaque material bonded to the surface of the plate 12. Alternatively, the opaque plate 12 may be made of metal or other opaque material with cutout characters 13 filled with a light-transmitting plastic.

The two plates 5 and 12 are surrounded by a frame 15 that has the cross-sectional configuration of a channel 16—the plates 5 and 12 being confined between the flanges 17 thereof. A first electrical conductor 18 is a bare wire seated in a groove 19 in the edge of the light-source plate 5 that communicates with the recesses 6 thereof such that the wire is in contact with a terminal of each lamp 7. The second electrical conductor 20 is, in the preferred embodiment, the frame 15, itself—the outer surfaces 21 thereof being insulated with a non-conductive coating such as paint. A plurality of small, electrically conductive leaf springs 22 are attached to the inside of the frame 15 so that each will contact the terminal of a lamp 7 that is not in contact with the first conductor 18. Alternatively, if the frame 15 is made of some electrically nonconductive material, the second conductor 20 may be a strip of metal, not shown, and the leaf springs 22 may be raised portions thereof.

The resulting sign 11 is typically a low voltage system and may be connected into any low voltage circuit, or it may be equipped with a step-down transformer, not shown, of a commercially available type.

The frame 15 is separable at one corner 23 for easy replacement of lamps 7 or opaque plates 12. It is normally held together at this point by a snap tab 24 that engages a small depression in the top portion 25 of the frame 15. A hinge 26 at the opposite corner 27 of the frame 15 facilitates separability thereof.

The electrical conductors 18 and 20 are attached to wires 28 that pass through a hole 29 in the frame 15 for connection to a power source, not shown.

An important feature of the invention is that the electric lamps 7 are uniquely socketed in the light source plate, itself. The bulb portion of each lamp is inserted in a cavity in the edge of the plate with its terminal end extending outwardly. This unique socketing of the electric lamps simultaneously yields a number of valuable results, some of which were quite unexpected: (1) Since the bulbs are essentially embedded in the transparent material of the light-source plate and the surfaces thereof are internally reflective, the light is conserved to a maximum extent—virtually all of the light produced by the bulbs is used to illuminate the sign; (2) Since the bulbs are frictionally retained in the cavities of the light-source plate, there are no loose lamps to control when assembling the sign; (3) Construction of the sign is greatly simplified by eliminating conventional lamp sockets and the box-like structure ordinarily used for mounting sockets and associated circuiting; (4) An attractive frame becomes the chassis for electrical circuitry; and (5) The resulting sign may be made much thinner than was previously possible.

An invention has been described that advances the art of illuminated signs. Although the embodiments have been described with considerable specificity, it should be noted that certain details may be altered without departing from the scope of the invention, as it is defined in the following claims.

The invention claimed is:

1. An illuminated sign comprising:
   a transparent light-source plate having cavities in the edges thereof and having an opaque surface and a translucent surface, both surfaces being internally reflective;
   a plurality of electric lamps, one seated for frictional retention in each of the cavities with its terminals extending outwardly;
   at least one opaque plate fitted over the translucent surface of the light-source plate, each opaque plate having a character therein covered on at least one side with opaque material except for the character;
   a frame surrounding the edges of the plates and comprising an externally insulated channel that confines the transparent and opaque plates between its flanges, and, further including electrically-conductive means fixed inside the channel that may contact lamp terminals, so that the frame will function also as an electrical conductor thereto;
   a second electrical conductor seated in a groove in the edge of the transparent plate and capable of contacting a terminal in each of the lamps; and
   means for easy removal of the frame from the plates.

2. The sign of claim 1 wherein the surfaces of the light-source plate are made opaque and translucent by white paint applied with appropriate thicknesses to the surfaces thereof.

3. The sign of claim 1 wherein the light-source plate is made of a synthetic acrylate resin.

4. The sign of claim 1 wherein the character in the opaque plate is embossed.

5. The sign of claim 1 wherein the opaque plate is made of transparent material, covered on one surface, except for the character, with opaque paint.

6. The sign of claim 1 further including a hinge at one corner of the frame to fasten two separable portions thereof together, and a separable fastening means on the opposite corner of the frame, whereby the frame may be easily removable from the light-source plate and the opaque plates.

* * * * *